Sept. 8, 1942.　　　　L. M. PUSTER　　　　2,295,427
TEMPERATURE REGULATOR
Filed July 12, 1940　　　　2 Sheets-Sheet 1

Inventor
Louis M. Puster
By Cameron, Kerkam + Sutton　Attorneys

Sept. 8, 1942.  L. M. PUSTER  2,295,427
TEMPERATURE REGULATOR
Filed July 12, 1940  2 Sheets-Sheet 2

Inventor
Louis M. Puster.
By Cameron, Kerkam & Sutton
Attorneys

Patented Sept. 8, 1942

2,295,427

UNITED STATES PATENT OFFICE 2,295,427

TEMPERATURE REGULATOR

Louis M. Puster, Knoxville, Tenn., assignor to The Fulton Sylphon Company, Knoxville, Tenn., a corporation of Delaware Application July 12, 1940, Serial No. 345,223

19 Claims. (Cl. 236—99)

This invention relates to temperature regulators and, more particularly, to temperature regulators of the type which employ means for compensating for fluctuations in temperature other than that to which the temperature regulator is intended to respond for performing its designed function.

As will be apparent to those skilled in the art from the description of the invention hereinafter contained, said invention can be embodied in temperature regulators of a wide variety of form and construction and applied to a wide variety of uses, but for purposes of exemplifying the invention it will be illustrated and described as embodied in an oven regulator, the invention being of particular utility when applied to this use.

An oven regulator is designed to respond to variations in the temperature within the oven and control the medium supplying heat to the oven, whether electric, gaseous or liquid fuel, etc., to the end that a predetermined temperature may be maintained as nearly as may be within the oven. As the thermostatically operated switch, valve, or whatnot is ordinarily closely associated with the stove or other instrumentality containing the oven, the temperature of the ambient surrounding the thermostatic system will obviously vary from a variety of causes, as the number of burners that may be lighted if the oven is associated with a stove having burners for other purposes than heating the oven, or the temperature of the room, the presence or absence of drafts, etc. Again, in the case of thermostatically controlled gas valves, the temperature of the gas itself will vary, depending upon whether it is flowing from pipes in relatively cold ground as in winter or from pipes whose temperature has been raised by summer heat, and these temperature variations may be communicated to the thermostatic system. These and other sources of temperature fluctuation at or around the thermostatic system by which the heating medium is controlled are productive of variations in the expansion or contraction of the thermostat itself and the associated metal parts which do not reflect variations of temperature in the oven to which, ideally, the thermostatic system should alone respond.

In recognition of the foregoing difficulties in providing a thermostatic system that will control the heating medium closely in conformity with the temperature within the oven, numerous proposals have heretofore been made to employ a compensating thermostat responsive to these extraneous sources of temperature variation to the end that the net result of the cooperation of the principal thermostat and the compensating thermostat shall be approximately that which would exist if the thermostatic system responded only to the temperature within the oven. Devices of this character as heretofore proposed, however, have not been entirely satisfactory because they have generally been of a character which greatly complicated the thermostatic system, materially increasing the number of parts and therefore the cost of production and maintenance, or else they have been of a character which has rendered them only crudely or sluggishly responsive to the extraneous sources of temperature.

It is an object of this invention to provide a thermostatic system of the type referred to wherein the compensating thermostat is simple in construction, and therefore adds little to the complexity of the structure or the cost of production and maintenance, while at the same time it is sensitively responsive to fluctuations of extraneous temperature so that close control of the heating medium may be effected.

In devices of the type under consideration, means must ordinarily be provided whereby, when the controlling means as a switch or valve is moved to extreme position, a continued change of temperature that would otherwise tend to continue the movement of the controlling means in the same direction will not cause injury to the thermostatic system. Thus when the valve member is moved into engagement with its seat to discontinue the flow of gas, to take a specific illustration, the temperature at the thermostat may for a period continue to rise, tending to expand the thermostat to a greater extent, but as the valve is abutted against its valve seat such continued expansion may produce enormous bursting pressures within a fluid-type thermostat if no provision is made to permit overrun of the thermostat. Provisions for taking care of this overrun as heretofore employed have also complicated the construction and added to its cost of production and maintenance.

It is an object of this invention to provide means for taking care of this overrun that are simple and inexpensive in character and, more particularly, it is an object of this invention to combine the functions of a compensating thermostat and the means for absorbing overrun of the principal thermostat into a single structure so that a single means performs both of the foregoing functions, whereby the simplicity of the structure is greatly increased with the concomitant advantage of lower production and maintenance costs and less consumption of space.

A further object of this invention is to provide a device of the type last characterized which is sensitive in its performance of both of these functions.

Another object of this invention is to provide a device of the type heretofore described which is relatively simple in construction, compact, highly efficient, and capable of large scale production at relatively low cost.

Other objects will appear as the description of the invention proceeds.

The invention is capable of receiving a variety of mechanical expressions, three of which are illustrated on the accompanying drawings, but it is to be expressly understood that the drawings are for purposes of illustration only, and are not intended as a definition of the invention, reference being had to the appended claims for that purpose.

Referring in detail to the accompanying drawings, wherein the same reference characters are employed to designate corresponding parts in the several figures.

Figure 1:
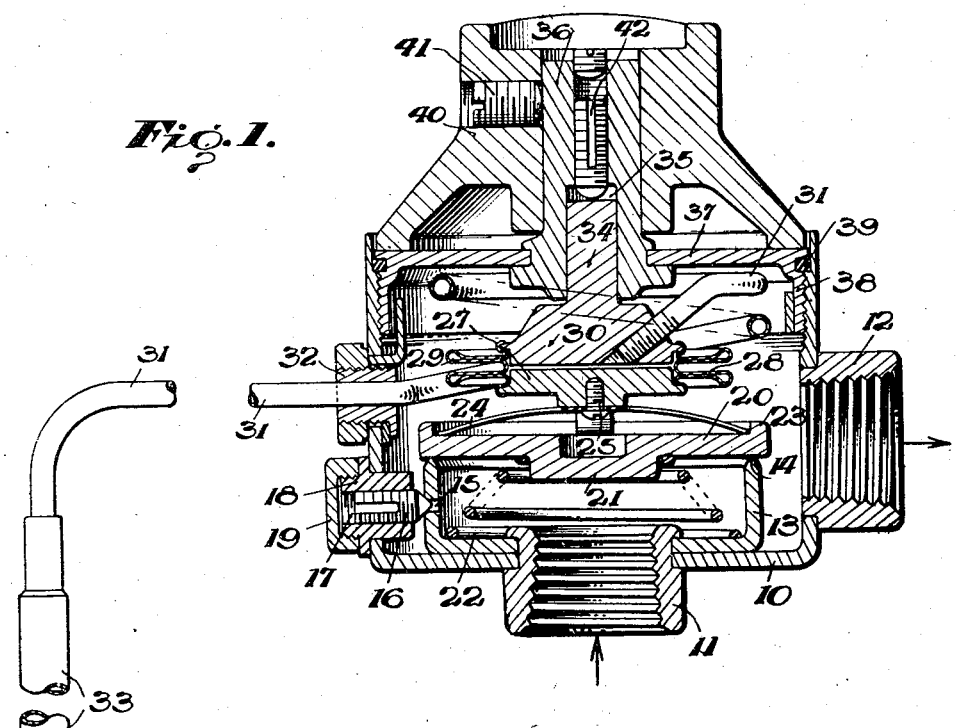
Fig. 1 is an axial section of an embodiment of the present invention.

In the form shown in Fig. 1, wherein the invention is illustrated as employed in the control of a gas valve, although it is to be expressly understood that the invention may be embodied in a thermostatically operated switch or a valve for the control of other heating media, the valve casing 10, which may be of any suitable size, construction and material, preferably takes the form of a cup-shaped element that may be conveniently formed as a sheet metal stamping. Casing 10 is provided with a suitable inlet nipple 11 and a suitable outlet nipple 12, both illustrated as interiorly threaded for the attachment of suitable piping and retained in apertures in the casing wall in any suitable way as by brazing or soldering. As illustrated, the attachment of the inlet nipple 11 to the casing 10 is also employed as a means for retaining in position a valve seat member 13, shown as a cup-shaped element clamped to the casing wall by the inwardly projecting end of the nipple 11 and provided with a suitable seating surface 14 at its inner periphery. Valve seat element 13 may also be conveniently formed as a sheet metal stamping.

The wall of the element 13 is provided with an aperture 15 with which co-operates a threaded adjustment plug 16 for varying the effective size of the aperture 15 and thereby controls the minimum flame adjustment. Plug 16 is threadedly mounted in the aperture 17 of a nipple 18 suitably retained, as by brazing or soldering, in an aperture in the casing 10 so as to provide a hermetically sealed joint. The exteriorly projecting end of the nipple 18 is threaded to receive a cap 19 which makes a gas-tight seal with the nipple 18 as well as prevents tampering with the plug 16.

Co-operating with the valve seat 14 is a valve member 20 of any suitable material, as hereinafter explained, the size of the valve member and seat being made such as to properly effect the control of gas flow in accordance with the demands of the installation. As shown, the valve member 20 is provided with a centrally arranged projecting boss 21 which constitutes a centering means for a coil spring 22 which reacts between the face of the valve member 20 and the bottom of the valve seat element 13 and tends to move the valve member toward open position. Valve member 20 at its rear face is made in the form of a shallow cup by provision of the rim 23, and sprung into the shallow recess or depression thus formed is a spider-like resilient element 24 of a dissimilar metal from that of the valve member 20, for a purpose hereinafter explained more in detail.

Member 24 is attached in any suitable way, as by a screw 25, to the rigid end member 27 of a thermostatic expansible and collapsible chamber 28 of any suitable size and construction. As here shown, the peripheral wall of said thermostatic chamber is formed by a corrugated bellows-like element having any suitable size and number of corrugations and formed of any suitable material. As illustrated, said element is composed of two outwardly extending corrugations and one inwardly extending corrugation, and the outwardly extended corrugations are preferably given a loop-like form as illustrated at 29 so that the lateral walls of the corrugations are in engagement when the chamber 28 is in its collapsed condition. Thereby its interior volume is materially decreased and the quantity of thermostatic fluid required to charge the thermostatic chamber is correspondingly diminished. For the same reasons the end member 27 and the opposite rigid end member 30 are preferably extended interiorly of the chamber 28 so as to nearly if not quite contact when the chamber 28 is in its collapsed condition, and thereby said chamber is further reduced in interior volume. If desired, the interior volume of the chamber may be still further decreased by providing solid rings at the bends of the outwardly extending corrugations so as to occupy a substantial part of the space thereat without interfering with the designed expansion and contraction of the bellows-like wall. Extending through the end member 30 and communicating with the chamber 28 is a tube or pipe 31 suitably sealed into an aperture in the end member 30. Said tube may be wound one or more times around the end member 30 as illustrated, and then it is extended through a threaded gland element 32 hermetically sealed into an aperture in the wall of the casing 10 and itself forming a hermetic seal with the tube 31. Tube 31 extends exteriorly of the casing 10 for any suitable length and at its outer end communicates with a bulb 33 of any suitable size and construction and which is designed to be mounted in any suitable way where it responds to the controlling temperature, as the temperature within an oven.

End member 30 is provided with a rearwardly extending stem 34 which is received within the recess 35 of a sleeve 36 mounted in any suitable way in the end wall 37 of a closure member 38 that is exteriorly threaded for reception within the interiorly threaded open end of the casing 10, a suitable packing 39 being provided to assure a gas-tight joint between the casing 10 and its closure member 38. Mounted on the sleeve 36, and secured thereto by set screw 41, is a rotatable knob 40 for operating the threaded closure member 38. Rotation of the knob 40 causes closure member 38 to move into or out of the aperture in casing 10 whereby thermostatic chamber 28 with its associated valve member 20, carried thereby may be made to approach the valve seat 14, against the tension of the spring 22, or recede from the valve seat 14 under the action of the spring 22. Knob 40 has associated therewith any suitable dial and pointer so that the location of the valve member with respect to its seat may be manually adjusted to maintain that valve setting which corresponds with the temperature that is indicated by the setting of the knob 40. A screw 42 in the threaded bore of sleeve 36 enables the location of the stem 34, and the thermostatic chamber 28 with its associated valve member 14, to receive a factory adjustment with respect to the closure member 38, and the knob 40 carried thereby.

The thermostat composed of bulb 33, tube 31 and thermostatic chamber 28 is charged with any suitable thermostatic material, the charge preferably being a liquid that completely fills said elements so that the thermostat operates on the liquid expansion principle, said liquid being so selected as to maintain its liquidity and effect the designed expansion and contraction at the temperatures at which the regulator is intended to operate.

As before indicated, the valve member 20 and the resilient member 24 are made of dissimilar metals so selected with respect to their size and the character and extent of extraneous temperatures for which compensation is to be effected that they co-operate to constitute a bimetallic thermostat that will introduce into the connection between the thermostat proper and the valve member the compensating function heretofore referred to. Furthermore, the resilient member 24 will yield if the thermostat proper continues to expand after the valve member 20 has engaged its seat, and therefore in itself it constitutes a provision that absorbs the overrun movement of the thermostat. By making the valve 20 of aluminum and the member 24 of spring steel, experience has demonstrated that substantially the desired compensation may be introduced and at the same time the member 24 functions as a spring that takes care of any overrun of the thermostat if the temperature at the bulb 33 continues to rise after the valve member 20 has engaged its seat 14. However, it is to be expressly understood that other suitable metals may be used for the valve member 20 and other suitable metals may be used for the spring-like member 24 to the end that the combined functions of a compensating thermostat and a provision for absorbing overrun may thus be incorporated into a single structure interposed between the thermostatic chamber 28 and the valve member 20.

In operation, the heating medium, as gas, enters the casing 11 and flows outwardly to the burner through the outlet 12, the quantity of flow, except for the minimum flame provision at 15, 16, being determined by the position of the valve member 20 with respect to its seat 14. Valve member 20 is moved toward its seat 14 by the expansion of the chamber 28 under the expansion of its liquid charge as determined by the temperature at the bulb 33, while valve member 20 moves away from its seat 14, as chamber 28 contracts, by reason of the action of the spring 22. If no other temperature were effective, the valve member 20 would accordingly at all times be so related to its seat 14 as would be determined solely by the temperature at bulb 33, and therefore the flow of heating medium would be so controlled as to maintain the predetermined temperature at bulb 33.

But, as heretofore pointed out, fluctuations of temperature are likely to occur around the casing 10, because this casing is normally disposed exteriorly of the stove or other instrumentality with which the thermostatically controlled valve is associated, so that fluctuations of temperature in the ambient may tend to act on the charge in the thermostat and the metallic parts of the thermostatic system so as to produce movements of the valve member which are uncalled for by the conditions existing at the bulb 33. Fluctuations in the temperature of the heating medium itself may also produce like results. But in conformity with the present invention such fluctuations of temperature in or around the casing 10 are imparted to the valve member 20 and its associated resilient member 24 of dissimilar metal so that the two, by reason of their co-operation, function as a well known type of bimetallic thermostat due to the differential expansion of the metals employed, member 24 flattening or bowing as its peripheral diameter is varied by reason of the condition of expansion or contraction of the peripheral wall of the recess or depression in the valve member 20. Thereby the distance between the thermostatic chamber 28 and the valve member 20 is changed and the valve member itself is repositioned with respect to its seat by an amount that, by proper design of the valve member 20 and its associated member 24, will substantially or precisely compensate for the undesired movement otherwise introduced by the temperature changes around or inside of the casing 10.

If the thermostat continues to expand after the valve member has engaged its seat the resilient member 24 will yield without injury to any of the parts of the thermostatic system, the inherent resiliency of said member 24 being made such that under no expected conditions will it take a permanent set by reason of the overrun of the thermostat. As soon as the thermostatic chamber 28 begins to contract, the member 24 will return to its normal position by reason of its inherent resiliency and thereafter member 24 will continue to function as one element of the bimetallic thermostat heretofore referred to.

Figure 2:
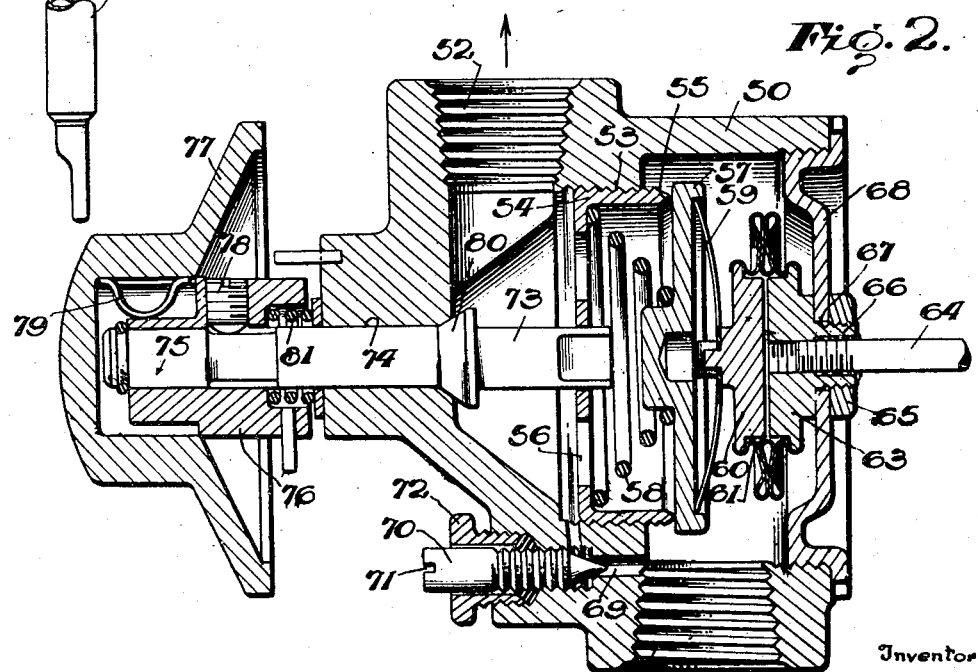
Fig. 2 is an axial section of another embodiment of the present invention.

The embodiment of Fig. 2 in many respects resembles that of Fig. 1 except that in this embodiment the manual adjusting means and the thermostat are disposed on opposite sides of the valve, adjustment being effected by movement of the valve seat with respect to the valve member. As here shown, the casing 50, which may take the form of a casting, or be formed of sheet metal as in the embodiment of Fig. 1, is provided with an inlet 51 and an outlet 52 shown as threaded to receive suitable conduits for the gas, or other heating medium. Interiorly, casing 50 is provided between the inlet and outlet referred to with a threaded aperture 53 in which is received an exteriorly threaded cup-shaped valve seat member 54 providing a valve seat 55 and having one or more apertures 56 in its bottom wall. Co-operating with the valve seat 55 is a valve member 57 which is or may be of the same construction as employed in the embodiment of Fig. 1. Interposed between said valve member 57 and the bottom of the cup 54 is a coil spring 58 tending to urge the valve member away from its seat. Co-operating with the valve member 57, as in the embodiment of Fig. 1, is a resilient spider-like member 59 sprung into the recess or depression at the rear of the valve member 57 and constituting a bimetallic compensating thermostat therewith as heretofore explained and also, by reason of the resiliency of the member 59, providing for overrun of the thermostat as heretofore described. Member 59 is mounted in any suitable way upon the end wall 60 of an expansible and collapsible chamber 61 whose peripheral wall is formed by a corrugated bellows-like element and whose opposite end is closed by the rigid end wall 63 through which extends a tube 64 leading to any suitable bulb, such as indicated at 33 in Fig. 1, the thermostat of this embodiment being shown as of substantially the same construction as that illustrated in Fig. 1 and described in more detail hereinabove. Said thermostatic vessel 61 is shown as clamped by means of the nut 65 on the threaded boss 66 projecting from the end member 63 through an aperture 67 in a removable cover plate 68 threadedly received in the open end of the casing 50, any suitable provision being made for effecting a hermetically sealed joint between said cover plate and said casing. Any suitable provision for maintaining a minimum flame is provided, a by-pass passage 69 being shown around the valve seat member 54 and controlled by a threaded plug 70 having a kerf for adjustment at 71 and a suitable packing gland at 72.

In this embodiment adjustment of the valve is effected by rotating the valve seat member 54 so that, by reason of its threaded engagement with the aperture in the casing 50 the valve seat 55 will be caused to approach toward or recede from the valve member 57. Any suitable means extending to the exterior of the casing 50 for rotating the valve seat member 54 may be employed. As here shown, a stem 73 is connected with the bottom of the valve seat member 54 in any suitable way so as to prevent relative rotation therebetween, and said stem 73 extends through an aperture 74 in the wall of the casing 50 to an exteriorly projecting portion 75 on which is mounted a sleeve 76 carrying a knob 77. Sleeve 76 is suitably retained on stem 75 as by a set screw 78 and knob 77 is suitably retained against rotation relatively to the sleeve 76 as by a spring key 79. Stem 73 interiorly of the casing 50 has a conical portion 80 which is normally urged into fluid-tight engagement with a conical seat at the aperture 74 by a coil spring 81 which reacts between the sleeve 76 and the exterior wall of the casing 50 or a suitable washer mounted thereon. As in the embodiment of Fig. 1, knob 77 is provided with any suitable indicia so that by co-operation with a pointer the desired temperature setting of the device may be effected.

Rotation of the knob 77 advances or withdraws the valve seat 55 relatively to the valve member 57, and coil spring 58 normally urges the valve member 57 away from said valve seat 55. For any given setting of the valve seat member 54, valve member 57 is advanced toward its seat by the expansion of the thermostatic chamber 61 or withdrawn from said seat as said thermostatic chamber 61 contracts by the action of the spring 58. Thereby the flow of gas past the valve seat 55 is exactly determined by the position of the valve member 57 with respect to its seat, and the position of said valve member in turn is determined by the action of the thermostat including the expansible and collapsible chamber 61. As in the embodiment of Fig. 1, the valve member 57 and resilient member 59 are subjected to the extraneous temperatures which would otherwise tend to upset the precise and desired action derived from the relatively remote bulb of the thermostat, i. e., fluctuations of temperature in the ambient surrounding the casing 50, fluctuations of temperature in the medium flowing through the casing 50, etc. Said temperatures are imparted to the members 57 and 59 and, by their designed action, they act as a bimetallic thermostat to compensate for such local temperature variations. If the thermostat tends to expand after valve member 57 has engaged its seat 55, such expansion is absorbed in the deflection of the member 59, against its inherent resiliency, thereby preventing any injury to the parts of the thermostatic system, and when the thermostatic chamber 61 contracts the member 59 by reason of its inherent resiliency will restore the parts to their original relationship. Thus the embodiment of Fig. 2 operates in the same way as heretofore described for the embodiment of Fig. 1.

Figure 3:
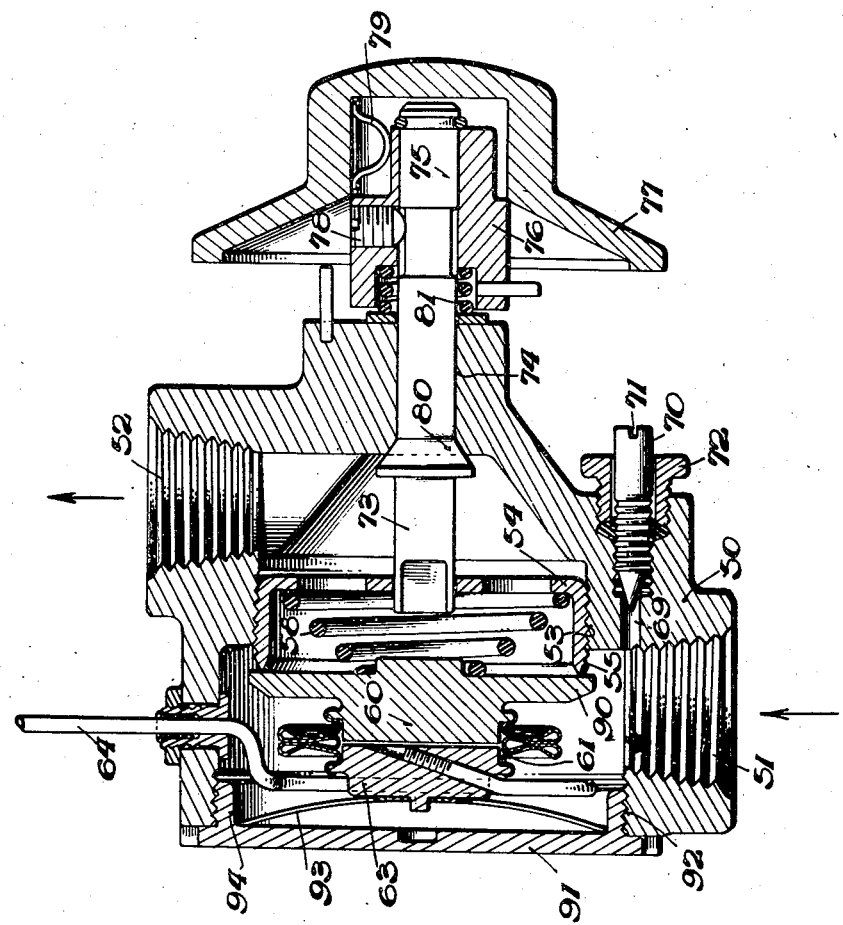
Fig. 3 is an axial section of yet another embodiment of the present invention.

The embodiment of Fig. 3 closely follows the embodiment of Fig. 2 except that the combined compensating thermostat and overrun provision is associated with the opposite end of the thermostat from that employed in Fig. 2 and also in Fig. 1.

As in the embodiment of Fig. 2, the casing 50 has an inlet 51 and outlet 52 and intermediate the same a threaded aperture 53 in which is threadedly mounted a cup-shaped valve seat member 54 providing a valve seat 55 that co-operates with valve member 90. Spring 58 is interposed between the bottom of the cup and the valve member as in the embodiment of Fig. 2, and valve seat 55 may be adjusted by rotation of a stem 73 projecting through an aperture 74 and provided exteriorly of the casing with a stem portion 75 on which is mounted a sleeve 76 and knob 77 with associated elements, all as described with respect to the embodiment of Fig. 2.

In this embodiment, valve member 90 is shown as integral with the end member 60 of the expansible and collapsible chamber 61 having its peripheral wall formed by a corrugated bellows-like element and closed at its opposite end by the end member 63. However, it is to be understood that if preferred the valve member 90 may be made separate from the end member 60 and suitably attached thereto. In this embodiment the tube 64 extends through a suitable aperture in the end member 63, more nearly as shown in Fig. 1, and communicates with any suitable bulb, as that indicated at 33 in Fig. 1.

In this embodiment the bimetallic compensating thermostat and provision for overrun are associated with the mounting of the thermostatic chamber 61 and take the form of a cup-shaped closure member 91 threadedly mounted in the aperture 92 at the open end of the casing 50, with any suitable provision for assuring a hermetically sealed joint therebetween, and a spider-like resilient member 93 sprung into the depression or recess formed by peripheral flange 94. End member 63 is mounted in any suitable way on said spider-like member 93 which reacts between said end member 63 and the closure member 91.

Again, as in the preceding embodiments, the fluctuations of temperature around and inside the casing 50 effect a relative differential expansion and contraction of the dissimilar metals of which the closure member 91 and the resilient member 93 are composed so that the location of the thermostat, and therefore the location of the valve member with respect to its seat, is varied with local changes of temperature so as to introduce the compensating function heretofore described in detail. Also, if the thermostatic chamber 61 continues to expand after the valve member 90 has engaged its seat 55 the thermostat, reacting against the abutment at 55, will flatten the spring-like element 93 so as to avoid injury to the thermostat. Upon contraction of the thermostat thereafter, the inherent resiliency of the resilient member 93 will restore the parts to their normal relationship.

It will therefore be perceived that by the present invention a temperature regulator has been provided which employs means for compensating for fluctuations in temperature other than that to which the temperature regulator is intended to respond and which at the same time avoids the objections and difficulties heretofore encountered where compensating thermostats have been employed, because the compensating provision is particularly simple in character, it at most requires no more than one additional member in the thermostatic system, and therefore the cost of production and of maintenance is maintained at a minimum. At the same time the compensating means is of a character that renders it sensitively responsive to any fluctuations of temperature occurring in or around the valve casing, and moreover the compensating means is of such a character that by variations in the size and material of the associated members the desired compensating action can be nicely predetermined.

Additionally the present invention provides for the inclusion of means to care for any overrun of the thermostat without the inclusion of additional elements, or if the overrun provision is considered as a necessary adjunct, the compensating means is provided without the addition of any element to the thermostatic system. In either event the combined compensating means and provision for absorbing overrun are of marked simplicity, whereby the inclusion thereof in the structure adds little to its cost and substantially nothing to its bulk, so that the combined functions are effected with the maximum simplicity and with high efficiency as well as with the desired sensitiveness and precision to accomplish the desired ends.

While in the embodiments of Figs. 1 and 2 one of the members of the compensating thermostat has, for purposes of exemplification, been made integral with the valve member, and in the embodiment of Fig. 3 integral with a wall of the valve casing, it will be apparent that the valve member or the casing member may be a separate member from the recessed member of the bimetallic thermostat and suitably attached thereto, either unitarily or otherwise. Thus the members of the bimetallic thermostat may be interposed at any suitable location in the connection between the expansible and collapsible thermostatic chamber and the valve member proper or between the thermostatic expansible and collapsible chamber and the casing on which it is mounted. If the recessed member of the bimetallic thermostat is made separate from the valve member proper or the casing wall, it may also be made of resilient construction so as to partake in the yielding of the bimetallic thermostat when said bimetallic thermostat functions as a means to absorb overrun of the thermostat.

While the embodiments of the invention illustrated on the drawings have been described with considerable particularity it is to be expressly understood that the invention is not limited thereto as the same may take a variety of expressions some of which will now be apparent to those skilled in the art, while changes may be made in the material, details of construction, arrangement of parts, etc., without departing from the spirit of this invention. Reference is therefore to be had to the appended claims for a definition of this invention.

What is claimed is:

1. In a temperature regulator of the type employing a thermostatically controlled valve mechanism which may be subjected to fluctuations of temperature at or adjacent to said valve mechanism, in combination with a thermostat, a single means associated with the thermostat and constituting a combined compensating thermostat for said temperature variations and the sole provision for absorbing overrun of the thermostat after the valve member has engaged its seat, said means comprising cooperating members which move relatively to each other both for compensating temperature variations and for absorbing overrun.

2. In a temperature regulator of the type employing a thermostatically controlled valve mechanism which may be subjected to fluctuations of temperature at or adjacent to said valve mechanism, in combination with a thermostat, a single means associated with the thermostat and constituting a combined compensating thermostat for said temperature variations and the sole provision for absorbing overrun of the thermostat after the valve member has engaged its seat, said last named means including two members of dissimilar metal one of which is of resilient construction and which members cooperate by differential expansion to vary the position of the valve member with respect to its seat and by relative yielding movement to absorb overrun of the thermostat.

3. In a temperature regulator of the type employing a thermostatically controlled valve mechanism which may be subjected to fluctuations of temperature at or adjacent to said valve mechanism, in combination with a thermostat, a single means associated with said thermostat for compensating for said fluctuating temperatures and providing the sole means for absorbing overrun of the thermostat, said means including a recessed metallic member and a resilient member of dissimilar metal sprung into said recess, said recessed member and said resilient member effecting relative movement of the valve member of said valve mechanism with respect to its seat by reason of differential expansion and said resilient member yielding after said valve member has engaged its seat to absorb overrun of said thermostat.

4. A temperature regulator according to claim 3 in which said cooperating recessed member and resilient member are interposed between the thermostat and the valve member proper.

5. A temperature regulator according to claim 3 wherein said recessed member and resilient member constitute a mounting for the thermostat.

6. In a temperature regulator of the type employing a thermostatically controlled valve mechanism which may be subjected to variations of temperature at or adjacent said valve mechanism, in combination with a thermostatically controlled valve mechanism a pair of coacting members of dissimilar metal associated with said thermostatically controlled valve mechanism and at least one of said members being of resilient construction, said members constituting a combined compensating thermostat for said variations of temperature and the sole means for absorbing overrun of said thermostat.

7. A temperature regulator according to claim 6 wherein said cooperating members of dissimilar metal are interposed between the thermostat and the valve member proper.

8. A temperature regulator according to claim 6 wherein said cooperating members of dissimilar metal constitute a mounting for the thermostat.

9. In a temperature regulator including a thermostat having an expansible and collapsible chamber, a valve member operatively connected to said chamber and a valve seat toward and away from which said valve member is moved by the expansion and contraction of said chamber, said valve member being formed of metal and having a depression at its rear face, and the operative connections between said chamber and valve member including a resilient member in the form of a bowed spring of metal which is dissimilar to that of said valve member, said resilient member being engaged in said depression and constituting a thermostat with said valve member, said bowed spring being also yieldable with respect to said valve member to provide for relative movement between said chamber and said valve member.

10. In a temperature regulator including a thermostat having an expansible and collapsible chamber, a valve member operatively connected to said chamber, and a valve seat toward and away from which said valve member is moved by the expansion and contraction of said chamber, and means mounting said thermostat including a metallic member having a depression in its face and a resilient member in the form of a bowed spring engaged in said depression and constituting a thermostat with said metallic member, said bowed spring being also yieldable with respect to said metallic member to constitute a yielding mounting for said thermostat.

11. In a temperature regulator including a thermostat having an expansible and collapsible chamber, a valve member operatively connected to said chamber and a valve seat toward and away from which said valve member is moved by the expansion and contraction of said chamber, means associated with said thermostat and constituting a second thermostat for varying the position of said valve member with respect to its seat including a metallic member having a depression in one of its faces and a resilient member engaged in said depression and constituting a bimetallic thermostat therewith, said second thermostat constituting the sole means for absorbing overrun of said first thermostat.

12. In a temperature regulator including a thermostat having an expansible and collapsible chamber, a valve member operatively connected to said chamber and a valve seat toward and away from which said valve member is moved by the expansion and contraction of said chamber, means associated with said thermostat and constituting a second thermostat, said means being composed of two members of dissimilar metals at least one of which is of resilient construction, said members being disposed at right angles to the axis of said thermostat and said resilient member being bowed outwardly with respect to its cooperating member so that it may yield under overrun of said thermostat, and constituting the sole means for absorbing said overrun.

13. A temperature regulator according to claim 12 wherein one of said members is integral with the valve member.

14. A temperature regulator according to claim 12 wherein said resilient member constitutes a yielding mounting for said thermostat.

15. A temperature regulator according to claim 12 wherein said members are interposed between the thermostat and the valve member proper.

16. A temperature regulator according to claim 12 wherein said members are interposed between the thermostat and its support.

17. In a temperature regulator including a thermostat having an expansible and collapsible chamber, a valve member operatively connected to said chamber and a valve seat toward and away from which said valve member is moved by the expansion and contraction of said chamber, cooperating members of dissimilar metal associated with said thermostat and constituting a combined compensating thermostat and the sole provision for absorbing overrun, and means for manually moving the valve member and its seat relatively to each other independently of the movements effected by said first named thermostat and said compensating means.

18. A temperature regulator according to claim 17 wherein said manually adjustable means advances the valve seat toward and away from said valve member.

19. A temperature regulator according to claim 17 wherein said manually adjustable means moves the thermostat and its associated valve member toward and away from its valve seat.

LOUIS M. PUSTER.